United States Patent
Kahn et al.

(10) Patent No.: US 8,868,111 B1
(45) Date of Patent: Oct. 21, 2014

(54) METHOD AND APPARATUS TO ENABLE THE USE OF A PERSONAL COMMUNICATION DEVICE WITH AN INTEGRATED VEHICLE INTERFACE

(75) Inventors: Philippe Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 17 days.

(21) Appl. No.: 13/427,835

(22) Filed: Mar. 22, 2012

Related U.S. Application Data

(60) Provisional application No. 61/466,901, filed on Mar. 23, 2011.

(51) Int. Cl.
*H04W 24/00* (2009.01)

(52) U.S. Cl.
USPC ............... 455/457; 455/414.1; 455/456.1; 455/456.3; 455/456.5; 455/456.6; 455/550.1; 455/556.2; 455/557; 455/569.1; 455/569.2; 701/29.1; 701/491; 701/533

(58) Field of Classification Search
USPC ............. 455/414.1, 550.1, 556.2, 557, 569.1, 455/569.2, 456.1; 701/491, 533
See application file for complete search history.

(56) References Cited

U.S. PATENT DOCUMENTS

| | | | |
|---|---|---|---|
| 6,622,083 B1 * | 9/2003 | Knockeart et al. | 701/533 |
| 7,330,737 B2 * | 2/2008 | Mahini | 455/557 |
| 7,346,374 B2 * | 3/2008 | Witkowski et al. | 455/569.2 |
| 7,650,230 B1 * | 1/2010 | Laverick et al. | 701/491 |
| 8,539,384 B2 * | 9/2013 | Hinckley et al. | 715/863 |
| 8,704,732 B2 * | 4/2014 | Pourbigharaz et al. | 345/1.1 |
| 2003/0153374 A1 * | 8/2003 | Gilmore | 463/6 |
| 2004/0204192 A1 * | 10/2004 | Holloway et al. | 455/575.1 |
| 2006/0200284 A1 * | 9/2006 | Hwang | 701/29 |
| 2009/0023475 A1 * | 1/2009 | Chang et al. | 455/557 |
| 2009/0306888 A1 * | 12/2009 | May et al. | 701/207 |
| 2010/0004853 A1 * | 1/2010 | Siereveld et al. | 701/201 |
| 2010/0010732 A1 | 1/2010 | Hartman | |
| 2010/0063717 A1 | 3/2010 | Proefke et al. | |
| 2011/0122074 A1 * | 5/2011 | Chen et al. | 345/173 |
| 2012/0053825 A1 | 3/2012 | Schunder | |
| 2012/0087078 A1 * | 4/2012 | Medica et al. | 361/679.31 |

* cited by examiner

*Primary Examiner* — Steve D Agosta
(74) *Attorney, Agent, or Firm* — HIPLegal LLP; Judith A. Szepesi

(57) ABSTRACT

A method and apparatus to couple a personal communications device to an integrated vehicle interface is provided. The method, in one embodiment, enables the use of the personal data on the personal communications device, to provide a feature to the user.

5 Claims, 7 Drawing Sheets

METHOD AND APPARATUS TO ENABLE THE USE OF A PERSONAL COMMUNICATION DEVICE WITH AN INTEGRATED VEHICLE INTERFACE

RELATED APPLICATION

The present application claims the benefit of U.S. Provisional Patent Application Ser. No. 61/466,901, filed Mar. 23, 2011, and incorporates that application by reference in its entirety.

FIELD OF THE INVENTION

The present invention relates to navigation systems, and more particularly to the use of a personal communications system with an integrated vehicle interface.

BACKGROUND

The use of global positioning system (GPS) systems in vehicles is becoming more common. GPS provides routing based on current location data obtained from a plurality of satellites, mapping data, and routing systems. Vehicles often have such systems built in. However, these systems have the inherent disadvantage that computer software, and particularly mapping and routing software, is improving rapidly. Additionally, map data is constantly changing as new roads are opened, exits are opened, closed, or moved, roads closed, etc. In general, built-in systems in vehicles are only refreshed when a user purchases a new vehicle. Therefore, there is a significant disadvantage to providing a built-in system for a vehicle.

One prior art method of overcoming this disadvantage is to provide a portable GPS system, which is then placed in the vehicle, and used in the vehicle.

SUMMARY

A method and apparatus to couple a personal communications device to an integrated vehicle interface is provided. The method, in one embodiment, enables the use of the personal data on the personal communications device, to provide features to the user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
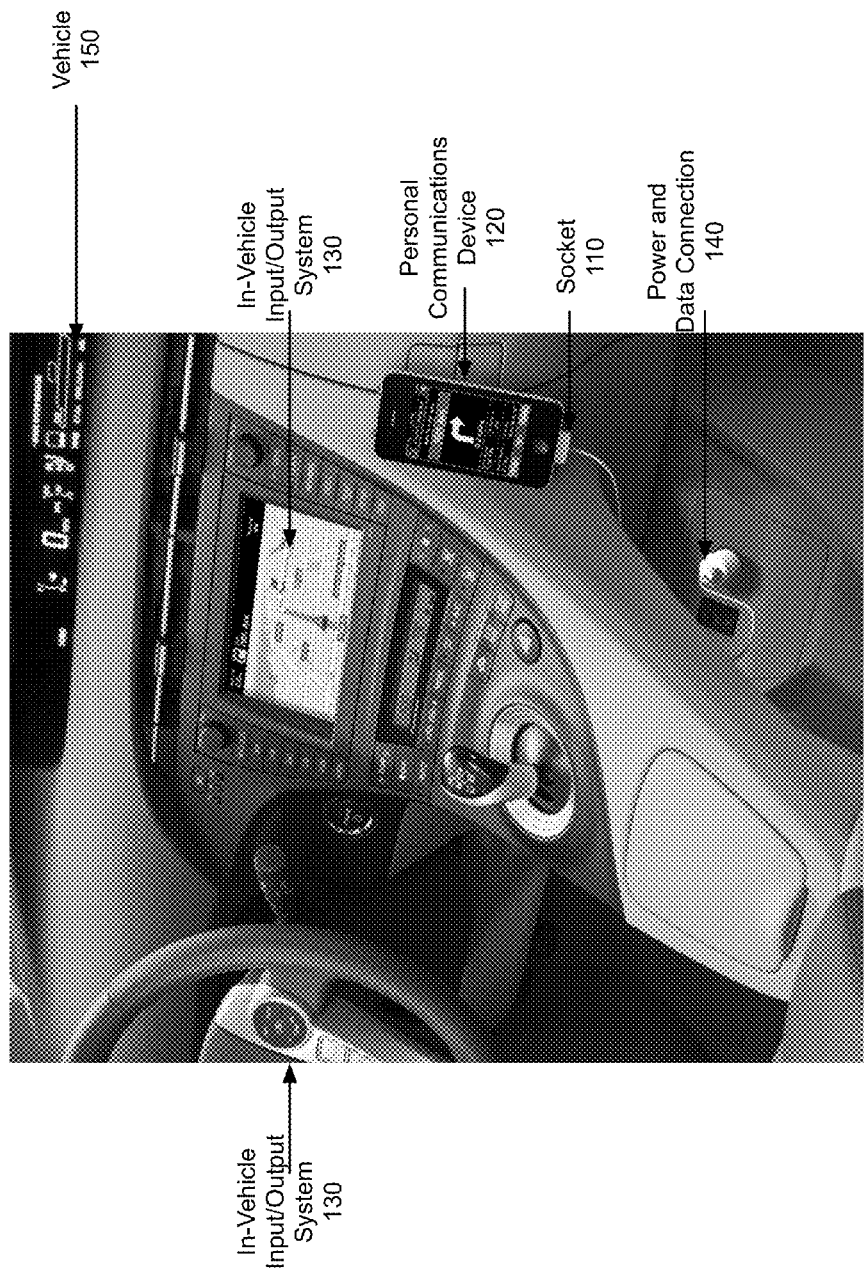
FIG. 1 is an illustration of one embodiment of a vehicle interface and the personal communication device.

The method and apparatus described enables a personal communication device such as a smart phone, tablet computer, personal digital assistant, or other portable computing device to be coupled to a vehicle to use the vehicle's integrated output and user interface mechanisms. A personal communications device, for the purposes of this patent, is any device which is has at least occasional network access, whether through wireless internet, cellular network, satellite, or other means, that is used to store, or access, personal data. Such personal data may include email, address book, calendar, notes, music, or other information.

In one embodiment, the personal communications device includes a global positioning system (GPS) chip, logic, and/or circuit, which enables it to receive GPS data from one or more satellites or other sources. In one embodiment, a GPS circuit may be located in the vehicle system, and its data may be provided to a personal communications device, which may or may not not include GPS. In one embodiment, an alternative location determination system is included in the personal communications device and/or the vehicle. Such alternative location determination systems may include one or more of a network-location based system, a motion sensor based system, another system, or a combination of one or more of the above, including GPS.

In one embodiment, the in-vehicle system interfaces with vehicle data to enhance the capabilities of the in-vehicle system. Vehicle data may include vehicle profile information including travel range, tank size/battery capacity/alternate fuel capacity, remaining fuel, vehicle specifics (e.g. tire pressure, oil life remaining, type of tire, etc.). This information may be used to display data to the user utilizing the dual display system, to inform guidance decisions, etc.

The integrated user interface mechanism may include one or more buttons, screens or heads-up displays, a microphone to receive voice data, or other input elements built into the vehicle. The outputs may include a screen or heads-up display, lights, speakers, or other features.

The combination of the personal communication device and the vehicle system enables both the simplification of the built-in aspects of the vehicle, removing the need for a dedicated guidance system, music player (MP3 or other format), or other apparatuses within the vehicle, while providing the advantages of the user-aware, continuously upgradeable personal communications device within the vehicle.

In one embodiment, the integration may enable the use of the input and output mechanisms of the personal communications device in addition to the use of the vehicle's input and output mechanisms. This may provide additional controls and displays, leading to further advantages. Furthermore, because the personal communication device includes personal information, such as calendar, contacts, music, etc. the integration of these types of data into the navigation system increases utility. In contrast, most prior art systems are dedicated single purpose devices, which have no context about the user and are only used for navigation.

The following detailed description of embodiments of the invention make reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIG. 1 is a diagram of one embodiment of a vehicle interface 150 and the personal communication device. In one embodiment, the personal communications device 120 is placed into a socket 110 in the vehicle 150. The socket 110 in one embodiment proves a wired connection between the vehicle 150, and the personal communications device 120, and provides a power and data connection 140. The socket 110 in one embodiment provides a charging capability. In another embodiment, the socket 110 may be replaced by a wireless network connection between the personal communications device 120 and the vehicle 150. The form of the connection, whether wired, wireless, or another form, establishes a communications link between the personal communications device 120 and the vehicle 150. The communication link may be continuous, periodic, or ad hoc. The vehicle 150 may provide various input/output mechanisms 130, as well as additional sensor data.

One purpose of the vehicle 150 in this navigation system is to provide user interface 130 features. UI or feedback systems, which may include screen(s), buttons, speakers, etc., are built into the vehicle. In one embodiment, buttons on steering wheel or dashboard of the vehicle 150 interface with the navigation system on the personal communications device 120. For example, the buttons 130 may allow navigation through a set user-configurable 'speed dial' destinations or settings. In one embodiment, when the user presses and holds a button, the system determines the selected destination, calculates the optimal route, and provides a route to the selected destination. In one embodiment, a button may allow the user to scroll through available destinations. These destinations may be displayed on a screen, announced through a built-in speaker, communicated through a Blue Tooth headset, communicated through a wired headset, etc.

In one embodiment, buttons built into the vehicle can be used to control the navigation system on the personal communications device. In one embodiment, buttons customized for a particular type of personal communications device, such as a telephone running the Android operating system by GOOGLE™, may be built into the car's dashboard or steering wheel in large, easy to use form factor. These buttons may be standardized for the device type, which would enable them to work with any device running that particular operating system, regardless of the manufacturer, or the version of the operating system.

In one embodiment, the system may use the built in voice recognition of the personal communications system, or the vehicle may provide voice interface features. In one embodiment, a navigation system on the personal communication or the vehicle system may translate commands, such that the navigation system may work with the vehicle regardless of the device type or operating system, e.g. an Android and an iOS based cellular phone would both work with the same vehicle, and be able to take advantage of the vehicle's I/O features and available sensor data.

Since the personal communications device is a fully integrated device, such as a smart phone, it can be directly connected to the user's contacts, calendar, music, web browsing history (including cookies), and other personal data. This data may be stored locally on the personal communications device, or may be accessible to the personal communications device via a network connection. In one embodiment, the navigation system is capable of using this information, along with the navigation features available in the system.

For the purposes of the present application, some or all of the above information can be considered: personal preference data (e.g. places the user has visited based on the data in the navigation data, social networking data, web cookie data, etc.), personal contact/destination data (e.g. contacts, and locations to be visited as specified by appointments on a calendar or to-do list), or other personal data available to the personal communications device. The data collectively will be referred to as "personal data."

In one embodiment, the system intelligently 'serves' custom tailored destinations to the user based on the personal data. For example, when a user is using the navigation system to search for a coffee shop, the system can use the personal preference data to determine the user's preferences. In one embodiment, this may be a filter option for displaying search results. The "personal preferences" filter, which in one embodiment uses a combination of the various types of user's data available to the personal communications system to organize the search results, or select the most likely preferred search results.

Figure 2:
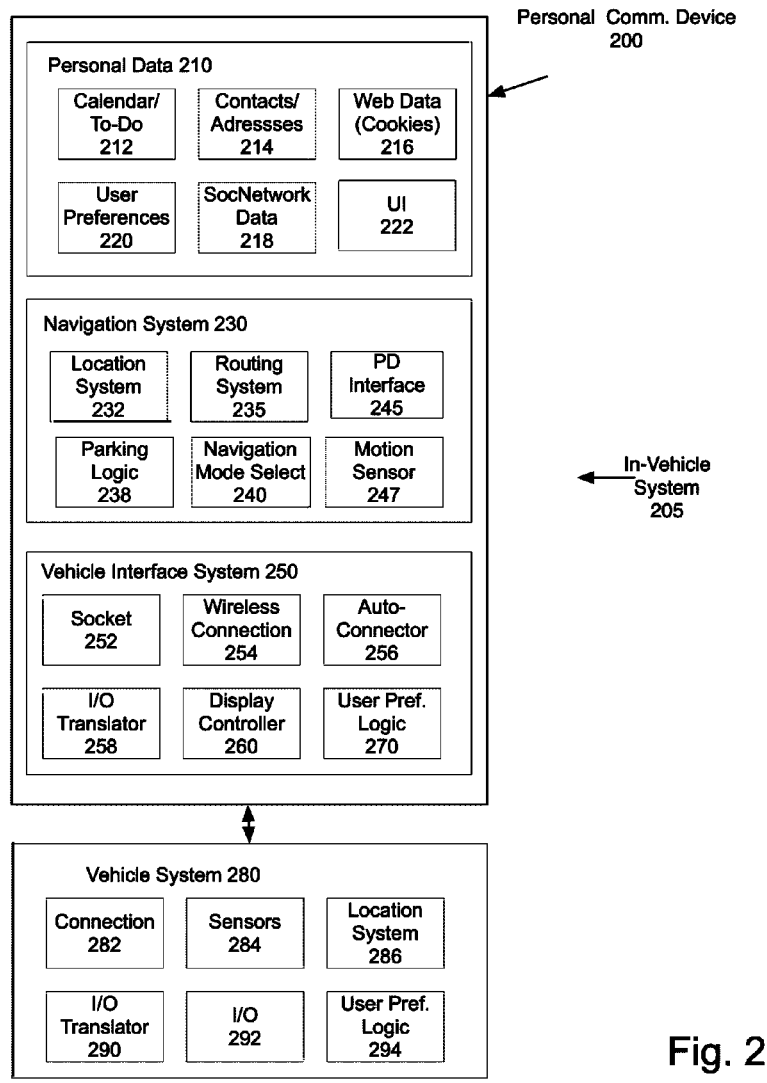
FIG. 2 is a block diagram of one embodiment of the personal communication device and the vehicle system.

FIG. 2 is a block diagram of one embodiment of the personal communication device 200 and vehicle system 280 together to function as an in-vehicle system 205. In one embodiment, the personal communication device 200 includes various types of personal data 210. The personal data 210 may include data from a calendar or to-do list 212, an address book or contacts 214, social network data 218, and web data such as cookies 216. In one embodiment, the personal data 210 may further include the user's manually entered preferences 220, entered via user interface 222. In one embodiment, these preferences 220 may be associated with the navigation system 230. In one embodiment, the user preferences 220 may be associated with other applications, with permission to access the preferences 220 given to the navigation system 230.

Navigation system 230 in one embodiment includes location system 232. Location system 232 comprises, in one embodiment, a global positioning system (GPS) chip and associated circuitry, software, and logic. The output of location system 232 in one embodiment is the user's current location, as associated with a map. One embodiment of a navigation system that may be used is described in co-pending U.S. application Ser. No. 13/160,439, entitled "A Method And Apparatus To Provide Guidance To A Vehicle Based On Vehicle Characteristics.". In one embodiment, location system 232 may receive the GPS data from the vehicle system 280, and process the GPS data as needed. Note that although the term "GPS" is used, the method used to obtain location and navigation data does not impact the functioning of the system.

Routing system 235 generates a route from a current location to a selected destination. In one embodiment, the destination may be manually entered by the user, or selected from the user's personal data 210 via personal data interface 245.

In one embodiment, parking logic 238 provides routing for parking locations, when a destination is reached. This is described in more detail below.

Navigation mode select 240 enables selection of the navigation modes, which may include driving, walking, biking, and other modes. In one embodiment, navigation mode select 240 automatically selects the navigation mode based on data from a motion sensor system 247.

Vehicle interface system 250 enables the personal communication device 200 to take advantage of the I/O features and other data available from the vehicle. In one embodiment, these features are available whenever the personal communication device 200 is coupled to the vehicle system 280 either via wired connection or network.

Vehicle interface system 250 in one embodiment includes a socket 252 and/or a wireless connection 254, to establish a connection between the personal communication device 200 and vehicle system 280.

Auto-connector 256, in one embodiment, automatically establishes the connection between the vehicle system 280 and the personal communication device 200 when a network connection or physical connection is made. Auto-connector 256, in one embodiment, reconfigures the output of the personal communication device 200 to optimize it for the I/O features 292 available via vehicle system 280.

I/O translator 258 optionally translates output and input formats, if the default formats of the navigation system 230 or other aspects of the personal communication device are not identical with the formats used by I/O features 292 in vehicle system 280. This may include video formats, audio formats, and formats for other data passed between the personal communication device and the vehicle system. For example, in one embodiment, the default audio output in a personal communication device 200 is mono, since most such devices have only a single speaker. In a vehicle I/O 292, on the other hand, there are multiple speakers. I/O translator 258 configures the audio output for the multiple speakers. Similarly, the button input may be mapped to the appropriate command by I/O translator 258.

Display controller 260 controls the display(s) of the vehicle system I/O 292 and optionally the display of personal communication device 200. In one embodiment, two or more screens or other visual display outputs may be used. Such outputs may include a built-in screen, a heads-up display, and the screen of the personal communication device 200. In one embodiment, the I/O translator 258, display controller 260, and auto-connector 256 have settings that may be modified by the user, via user preference logic 270. In one embodiment, user preference logic 270 may learn user preferences based on changed settings. For example, if the user reconfigures the screens, display controller 260 may maintain the new configuration as the default configuration.

Vehicle system 280 includes connection 282, which may be a network connection or a wired connection. I/O translator 290, in one embodiment, works with the I/O translator 258 in the vehicle interface system 250 or the personal communication device 200. In one embodiment, only one of the translators may be present in any system. The vehicle system 280 may also interact with sensors 284 within the vehicle. In one embodiment, vehicle system 280 may pass sensor data to the personal communications device 200 to be used in navigation as well as for I/O purposes. In one embodiment, the vehicle includes location system 286, which provides location and/or navigation data to the personal communications device 200. In one embodiment, this may replace the location system 232 in the personal communication device 200, or may act in conjunction with the location system 232.

In one embodiment, the vehicle system 280 may also have its own built-in I/O 292. Furthermore, in one embodiment, the I/O 292 of the vehicle system 280 may be used to set user preferences via user preference logic 294. In one embodiment, user preference logic 294 may override vehicle-specific preferences from personal communication device 200, while user-specific preferences from the personal communication device 200 may override the user preferences from user preference logic 294 in the vehicle system 280.

Figure 3:
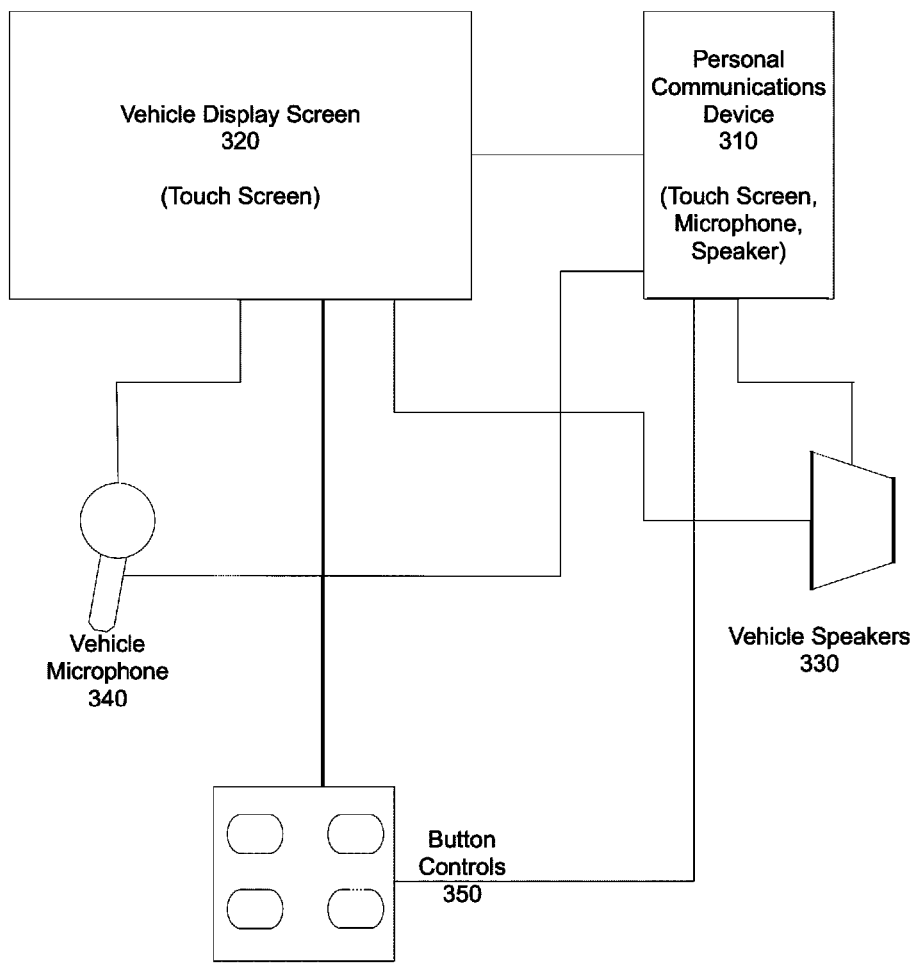
FIG. 3 is an exemplary user interface showing various input and output mechanisms available when the system is coupled to the in-vehicle system.

FIG. 3 is an exemplary user interface showing various input and output (IO) mechanisms available when the system is integrated in a vehicle.

In one embodiment, the IO mechanisms include the vehicle display screen 320, which in one embodiment may be a touch screen. The IO available also includes the IO features of the personal communications device 310, which may include a display screen that may be a touch screen, a microphone, and a speaker. Optionally the personal communications device 310 may include a physical keyboard. In another embodiment, the personal communications device 310 may include a soft keyboard, which is software generated and displayed on a touch screen.

In one embodiment, rather than using the microphone or speaker built into the personal communication device 310 the system routes the voice from vehicle microphone 340, and to vehicle speakers 330 or a paired headset.

In one embodiment, the vehicle also provides one or more button controls 350. For example, many vehicles now have buttons associated with their display screen 320, or located on the steering wheel to control the radio or navigation system. In one embodiment, the button controls 350 may be assigned by the user, based on user preferences. For example, the user may set a button control to "find a parking location" if that is a common feature they use, or "change map view," or "navigate home," or "scroll through saved destinations." In one embodiment, the buttons 350 may also include the standard volume controls.

Figure 4:
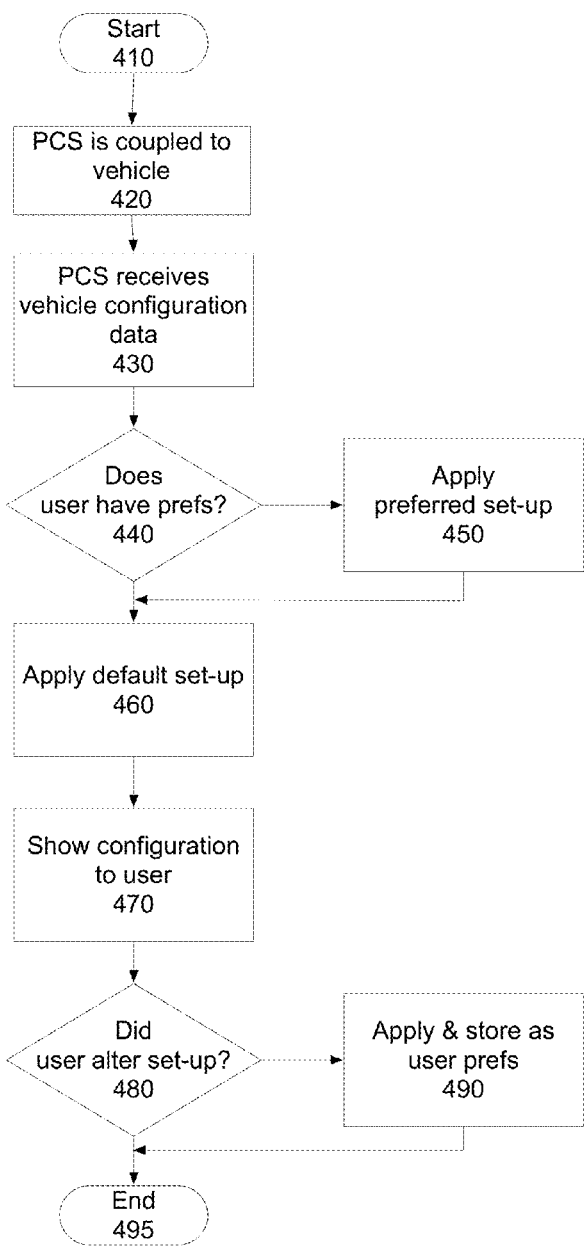
FIG. 4 is a flowchart of one embodiment of coupling the personal communications device to a vehicle system.

FIG. 4 is a flowchart of one embodiment of coupling the personal communications device to a vehicle system. The flowchart shows one embodiment of the connection between the personal communications system and a vehicle system. Different car models have different user interface elements and configurations, and one of skill in the art would understand the alterations needed based on available elements. The process starts at block 410.

At block 420, the personal communications system is coupled to the vehicle. As noted above, this may be done when the user inserts the personal communications device into a socket, connects another wired connection, or establishes a wireless connection between the vehicle system and the personal communications device. In one embodiment, the system automatically establishes a wireless connection when a personal communication device is in range of the vehicle system, and the vehicle system is active. In one embodiment, the vehicle system may be active when the vehicle is powered. In one embodiment, the wireless connection may be a Bluetooth connection.

When the connection is initially established, at block 430, in one embodiment the vehicle's configuration information is transmitted to the navigation system in the personal communication device. In one embodiment, when a user initially plugs the personal communications system into a vehicle, the vehicle indicates its configuration. In one embodiment, the configuration information may be as simple as the car made and model. For example, the vehicle may be a Ford Focus with 10 steering wheel buttons. In another embodiment, additional data may be communicated, including detailed data about the vehicle's current maintenance status, fuel availability, etc. In one embodiment, the navigation may take into account such data. In one embodiment, the methods described in co-pending U.S. application Ser. No. 13/160, 439, entitled "A Method And Apparatus To Provide Guidance To A Vehicle Based On Vehicle Characteristics." may be used in adjusting navigation based on the vehicle information. That application is incorporated herein in its entirety.

At block 440, the process determines whether the user has a preferred set-up for this vehicle. In one embodiment, preferences may be set by vehicle configuration or based on a particular vehicle. In one embodiment, the preferred set-up may include which screen(s) should be used for what portion of the display, the assignment of hard and soft buttons, and default configuration settings. In one embodiment, such default configuration settings may also include musical preferences. For example, when the connection is established, the system may start playing the user's preferred music, after an announcement that the system is ready for input.

If the user has a preferred set-up, at block 450 the preferred set-up is applied to the in-vehicle system. If no preferred set-up is available, a default configuration is applied at block 460. The default configuration, in one embodiment, has settings for each of the user interface elements available within the vehicle. For example, in the Ford Focus example above, a default functionality could be in one embodiment, button 1 is for a voice prompt of the next maneuver, button 2 is for 'one-press take-me home', buttons 3, 4, 5, 6, 7 are for panning and scrolling the map, button 8 is for favorite destinations, button 9 is for voice input of destination, and button 10 is for volume control.

At block 470, the user is informed of the current configuration, and given the opportunity to reconfigure the system. In one embodiment, the configuration is shown in image or text on the large vehicle display screen and/or the personal communications device screen. In another embodiment, the configuration may be communicated via verbally.

At block 480, the process determines whether the user made any changes to the configuration. If so, the changes are applied to the current configuration, and are stored as an updated preferred set-up for this vehicle, at block 490. In one embodiment, the user may indicate that the updated configuration should be applied to all vehicles, or just to this particular vehicle. If the user indicates that the preferences should apply to all vehicles going forward, this information is stored, and any preferences for other vehicles, or default preferences, are appropriately updated. The process then ends, at block 495.

Figure 5:
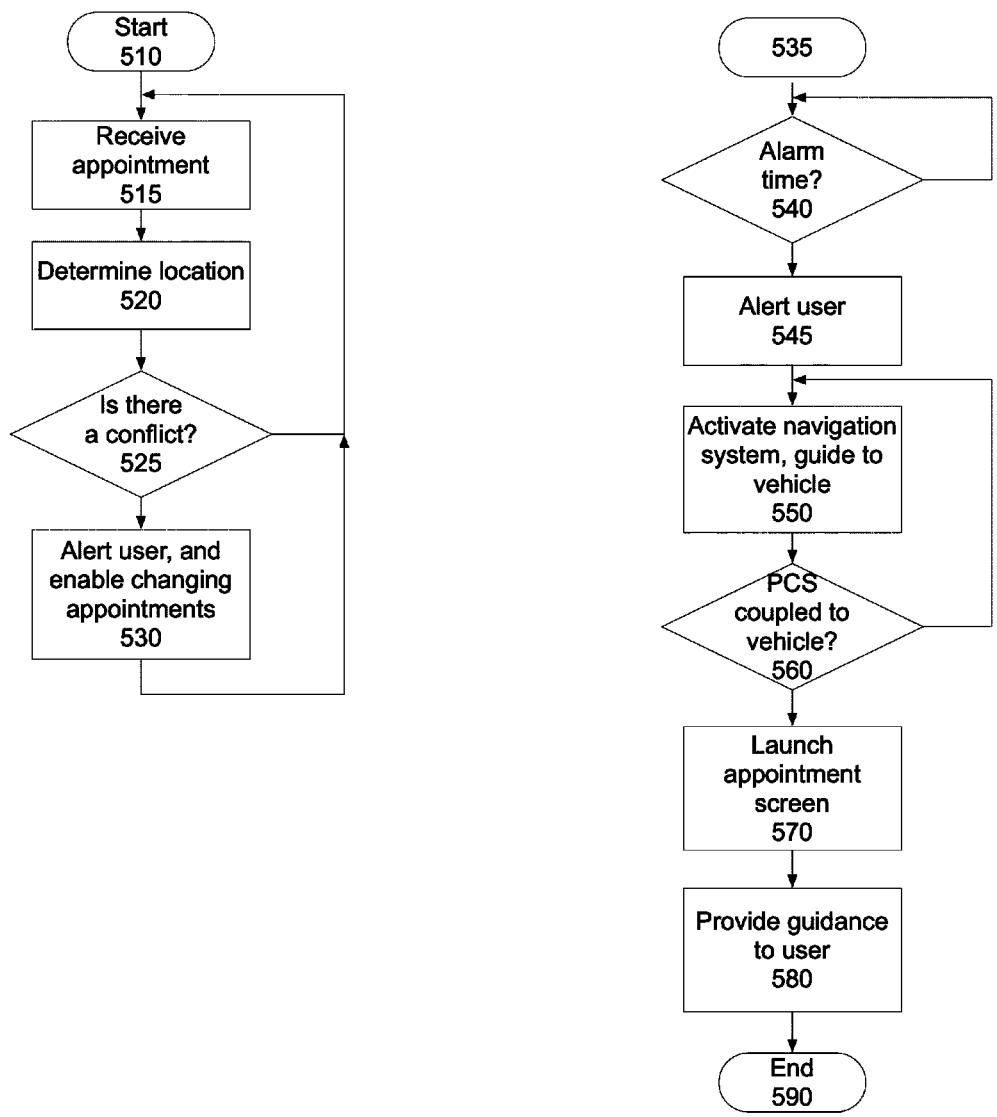
FIG. 5 is a flowchart of one embodiment of using the integrated in-vehicle system.

FIG. 5 is a flowchart of one embodiment of using the integrated in-vehicle system. One exemplary use of having the integrated personal information available is to do smart scheduling, by including navigation in the scheduling system. The process starts at block 510.

At block 515, a user enters an appointment into a calendar program, which is either on the personal communications device, synchronized with the data on the personal communications device, or accessible to the personal communications device via a network connection. The Navigation system can access data from the calendar, or may be integrated with this calendar.

At block 520, the location associated with the appointment is determined. In one embodiment, this is done using a mapping system, in a processor of the personal communications system. In one embodiment, an estimated time from the user's location to the location associated with the appointment is calculated. This calculation may, in one embodiment, take into account an expected traffic levels at the time of day when the user is likely to be driving to the appointment. For example, a ten mile drive in San Francisco may take twenty minutes in the early afternoon, but an hour during the evening commute. In on embodiment, "live" data may also be included in this evaluation, such as road closures, weather, or other elements which may impact the navigation time.

At block 525, the process determines whether there are any conflicts between the new appointment and existing appointments. In one embodiment, the system alerts the user if a new appointment is entered which conflicts in timing with an existing appointment. The conflict takes into account the timing of the appointment and the time for navigation between the two points, if they are not in the same location.

For example, if a user has an existing appointment starting at 1:30 p.m. for one hour in Santa Cruz, and then schedules a second appointment at 3 p.m. in San Francisco, the system may alert the user that the new appointment has an estimated a travel time of one hour, and thus the second appointment may not be reachable, based on the distance and timing. In one embodiment, when there is a conflict, the user is alerted, at block 530. The process then returns to block 515, to enable the entry of appointments. In one embodiment, the user may override the warning of conflict, and maintain the conflicting appointments. If there is no conflict, the process returns directly to block 515, to enable the entry of further appointments.

The system monitors the user's calendar, at block 535.

At block 540, the process determines whether an appointment time is within range. In one embodiment, the appointment time is considered within range a preset period of time before the expected time that the user needs to be traveling. In one embodiment, the system calculates an alarm time when an appointment is noted in the calendar, where the alarm time is travel time plus lead time. In one example, for an appointment at time X at a location that is an hour from the user's current location, the start time is X−1, and the alarm time is thirty minutes before the start time. Thus, an hour and a half before the time of the appointment an alarm would sound, indicating to the user that he or she should prepare to leave in 30 minutes. In one embodiment, the user may modify the alarm time, and set the alarm to any time between two hours and at the estimated start time. In one embodiment, the user may set a "default" alarm time (e.g. 30 minutes before the estimated start time) and may set an alarm time on a per appointment basis. When the alarm time is detected, at block 540, the user is alerted.

At block 550, the navigation system is activated, to generate a route for the user from his or her current location to the destination associated with the appointment. In one embodiment, the system may pre-calculate the route. This is advantageous because it enables routing even when GPS or other location signals are not available. In one embodiment, the pre-calculation of the route, and downloading of map segments may be based on user preference settings.

In one embodiment, the navigation system may provide directions to the user's vehicle. In one embodiment, using motion sensing technologies, the system is able to detect when the user exits a vehicle. Since generally the user takes the personal communications device, when the user exits the vehicle, the personal communications device would be able to guide the user back to the vehicle. In one embodiment, the system marks the vehicle's location when the user exits the vehicle.

After the alarm is sounded, and the user starts walking, in one embodiment, the user is guided back to the vehicle's location. In one embodiment, the alarm displays the option of "guiding back to the vehicle?" and the guidance to the vehicle is only provided when the user makes that selection. In one embodiment, the system is capable of differentiating between driving, riding a bicycle, taking a bus, etc. Thus, the user would not be guided to an incorrect bus stop, or to a vehicle that is too far away.

At block 560, the system determines whether the personal communications system has been coupled to the vehicle system. As noted above, this may be done via a physical connection, wirelessly, etc.

If so, at block 570, the navigation solution launches from the background and opens to a screen showing the location details of the appointment, the time of the appointment, and enables the user to initiate navigation with a single click. In another embodiment, the navigation is automatically initiated. In one embodiment, the user may be informed of the appointment and navigation via voice interaction. The process provides guidance to the user, in accordance with the user's preferences, at block 580.

The process then ends, at block 590. Note that while this is illustrated as a flowchart, it is performed on an as needed basis. That is, the user may enter appointments at any time. Upcoming appointments are continuously monitored for alerts and navigation. Navigation is provided as needed.

Figure 6:
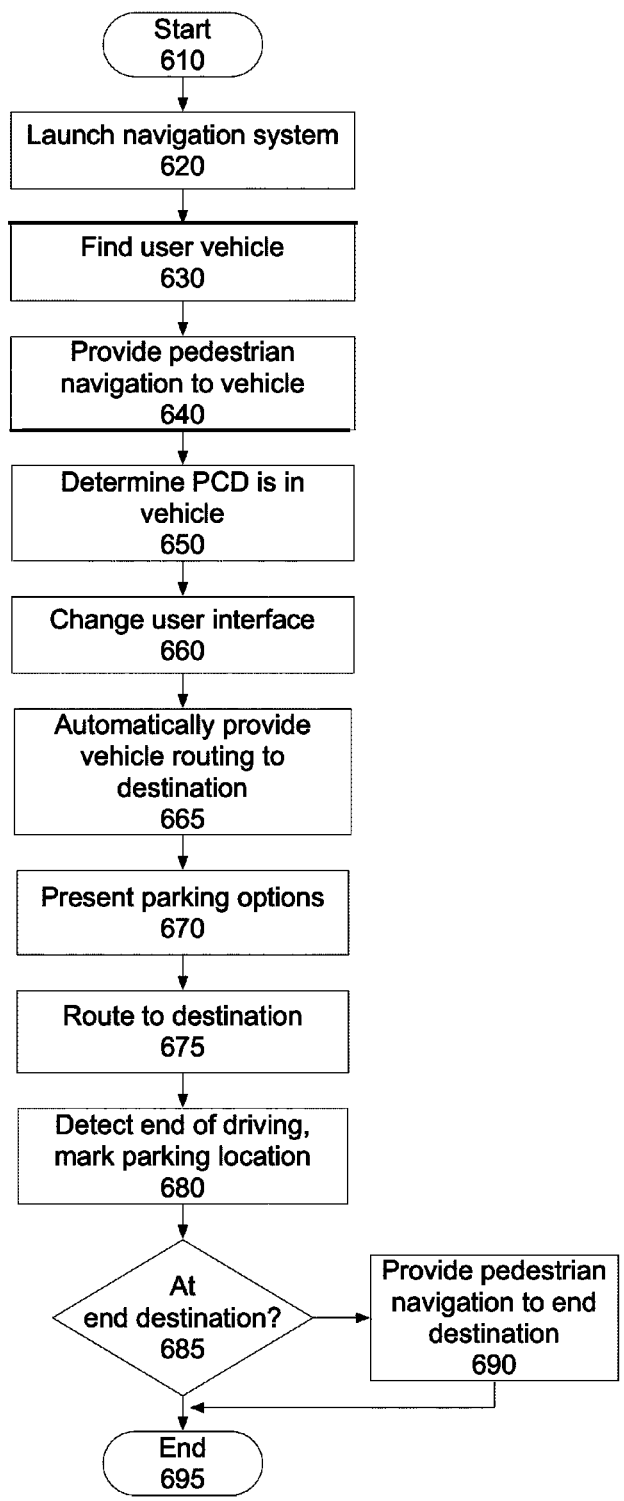
FIG. 6 is a flowchart of another embodiment of using the integrated in-vehicle system.

FIG. 6 is a flowchart of another embodiment of using the integrated in-vehicle system. The process starts at block 610.

At block 620, the user launches the navigation system. When the user launches the navigation system, the navigation system may display a probable destination. This suggestion may be based on the calendar (e.g. appointments), on the time of day (e.g. lunch), and/or user commands. For example, the user may have indicated he or she is going to lunch. In one embodiment, the navigation system may ask the user to pick a destination. The user may pick a destination from his or her contacts, calendar, past destinations, web sites, or using the search abilities provided by the navigation system.

At block 630, the process determines the current location of the user's vehicle. In one embodiment, the vehicle's location is marked when the user exits the vehicle. The process, at block 640, provides pedestrian navigation to the vehicle's location.

At block 650, the process determines that the personal communications device is now in the vehicle. This may be detected based on the motion of entering the vehicle, a connection with the vehicle system, or a connection with a socket in the vehicle.

At block 660, the user interface display changes to provide the primary display on the vehicle's display, and the personal communications device may have a secondary display. For example, the personal communications device can provide a simple interface, providing a control, or next turn indicator, etc.

At block 665, the process automatically starts routing the user to the selected destination.

In one embodiment, at block 670, when the user is approaching the destination, the system presents parking options. For example, in one embodiment, the system announces, "press 1 to be guided directly to your destination, press 2 to go to in-n-out parking 0.2 miles from your destination and $8.99/hour, press 3 to go to ABC parking 0.3 miles from your destination, $5.99/hour." etc.

At block 675, the process identifies the destination as the selected parking option, or leaves it as the actual destination if no selection was received. The user is routed to the destination.

At block 680, in one embodiment, when the user parks their vehicle, the system marks the current location as the parking spot automatically. It then determines whether the user is at the original selected end destination, at block 685. If so, the process ends, at block 695. Otherwise, at block 690, the process switches to pedestrian navigation, to guide the user from the parking spot to their destination. The process ends at block 695.

Figure 7:
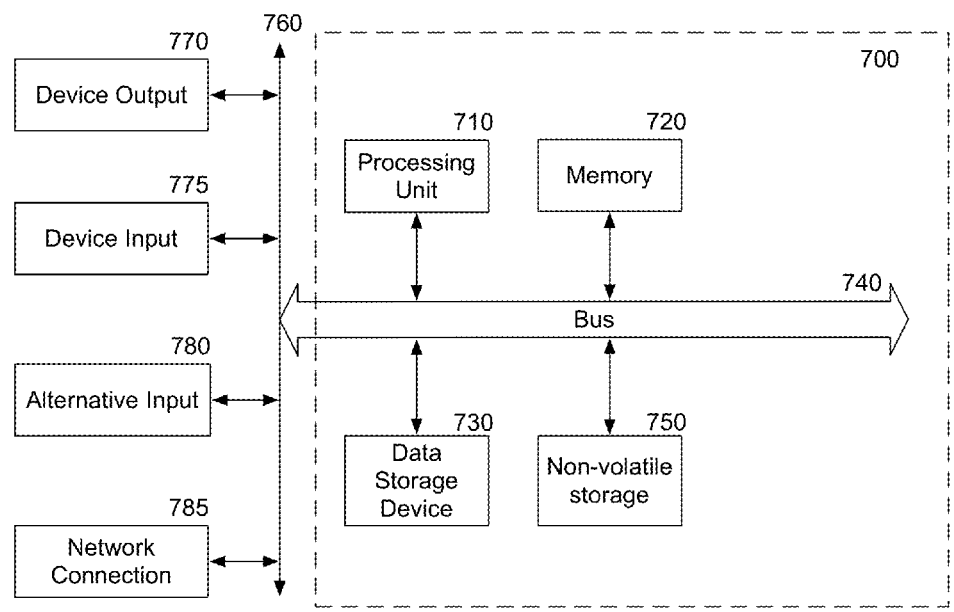
FIG. 7 is a block diagram of one embodiment of a computer system, which may be incorporated into the personal communication device and/or the vehicle system.

FIG. 7 is a block diagram of one embodiment of a computer system which may be incorporated into the personal communication device. FIG. 7 is a block diagram of a particular machine, which may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment, the system also includes data storage device 730 such as a magnetic disk or optical disk and its corresponding disk drive, or Flash memory or other storage, which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network, or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 740, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    detecting a coupling of a personal communications device to a built-in vehicle interface and sensors to determine vehicle status information, the vehicle status information defining the coupling of features;
    providing input and output for the personal communications device through the built-in vehicle interface;
    using personal data from the personal communications device to provide a feature to the user;
    displaying data on a built-in screen in the vehicle, and displaying additional data on the screen of the personal communication device, wherein the data can provide at least the following:
    for navigation, map data on a first screen and turn-by-turn data on a second screen,
    for navigation, a map of a whole path on the first screen, and zoomed-in map of upcoming turns on the second screen,
    for music, lyrics on the first screen, and album covers on the second screen, and
    for telephone calls with another person, controls for the telephone call on the first screen, and an image of the other person on the second screen.

2. The method of claim 1, wherein the feature comprises navigation, provided on the built-in vehicle interface, based on calculations performed within the personal communications device.

3. The method of claim 1, further comprising:
    mapping buttons built into the vehicle to controls for the feature provided via the personal communication device.

4. The method of claim 1, wherein the feature provided comprises navigation.

5. The method of claim 4, wherein the feature provided comprises navigation to a destination determined based on calendar data in the personal communications device.

* * * * *